United States Patent
Colotte et al.

(10) Patent No.: US 8,690,521 B2
(45) Date of Patent: Apr. 8, 2014

(54) SYSTEM FOR CONTROLLING VARIABLE GEOMETRY EQUIPMENT FOR A TURBINE ENGINE, ESPECIALLY BY BELLCRANKS

(75) Inventors: Baptiste Benoit Colotte, Melun (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 536 days.

(21) Appl. No.: 13/121,726

(22) PCT Filed: Sep. 29, 2009

(86) PCT No.: PCT/EP2009/062621
§ 371 (c)(1), (2), (4) Date: Mar. 30, 2011

(87) PCT Pub. No.: WO2010/037749
PCT Pub. Date: Apr. 8, 2010

(65) Prior Publication Data
US 2011/0184573 A1    Jul. 28, 2011

(30) Foreign Application Priority Data
Sep. 30, 2008 (FR) ...................................... 08 56565

(51) Int. Cl.
*F04D 29/56* (2006.01)

(52) U.S. Cl.
USPC ............ 415/36; 415/149.4; 415/191; 416/47; 416/104; 416/168 R (58) Field of Classification Search
USPC .............. 415/36, 40, 42, 149.1, 149.2, 149.4, 415/150, 153.2, 191; 416/44–47, 103–107, 416/112, 168 R
See application file for complete search history.

(56) References Cited

U.S. PATENT DOCUMENTS

| 4,292,802 A | 10/1981 | Snow |
| 4,403,912 A * | 9/1983 | Pekari et al. ............... 415/150 |

(Continued)

FOREIGN PATENT DOCUMENTS

| DE | 12 24 563 | 9/1966 |
| EP | 1 398 464 | 3/2004 |

(Continued)

OTHER PUBLICATIONS

U.S. Appl. No. 13/379,869, filed Dec. 21, 2011, Gaully, et al.
International Search Report issued Nov. 4, 2009 in PCT/EP09/62621 filed Sep. 29, 2009.

(Continued)

*Primary Examiner* — Igor Kershteyn
(74) *Attorney, Agent, or Firm* — Oblon, Spivak, McClelland, Maier & Neustadt, L.L.P.

(57) ABSTRACT

A system for controlling at least two sets of variable geometry equipment of a turbine engine. The turbine engine includes at least one first body and a second body, the first set of equipment being a stage of variable stator vanes of a compressor of the first body moving between a closed position during idling and an open position at high speed, and the second set of equipment being at least one bleed valve of a compressor of the second body moving between an open position during idling and a closed position at high speed. The actuator drives the second set of equipment by an actuating part that is actuated over part of the course of the actuator and idle on an abutment over the rest of the course, and by a sliding joining element providing a backlash in the actuation of the second set of equipment.

10 Claims, 5 Drawing Sheets

(56) References Cited

U.S. PATENT DOCUMENTS

| | | | |
|---|---|---|---|
| 4,992,946 A | 2/1991 | Butz et al. | |
| 2004/0050071 A1 | 3/2004 | Bachelder et al. | |
| 2006/0263206 A1 | 11/2006 | Bouru | |
| 2008/0028764 A1 | 2/2008 | Cadieux | |
| 2010/0080684 A1 | 4/2010 | Colotte et al. | |
| 2010/0158662 A1 | 6/2010 | Colotte et al. | |
| 2010/0158663 A1 | 6/2010 | Colotte et al. | |
| 2011/0182716 A1* | 7/2011 | Bouru et al. | 415/148 |

FOREIGN PATENT DOCUMENTS

| | | |
|---|---|---|
| EP | 1 724 472 | 11/2006 |
| FR | 2 445 439 | 7/1980 |
| FR | 2 633 046 | 12/1989 |
| WO | 2007 116319 | 10/2007 |

OTHER PUBLICATIONS

U.S. Appl. No. 13/121,752, filed Mar. 30, 2011, Colotte, et al.
U.S. Appl. No. 13/121,706, filed Mar. 30, 2011, Colotte, et al.

* cited by examiner

SYSTEM FOR CONTROLLING VARIABLE GEOMETRY EQUIPMENT FOR A TURBINE ENGINE, ESPECIALLY BY BELLCRANKS

The present invention relates to the general field of the control of variable geometry equipment items of a turbine engine. The invention relates more particularly to the optimization of the control of several equipment items forming part of distinct bodies of the turbine engine.

The expression "variable geometry equipment" should be understood here to mean an equipment item linked to a control member and the dimension, the shape, the position and/or the speed of which is or are likely to be modified according to detected events or defined parameters, to act on the operation of the turbine engine. Examples of variable geometry equipment items include air discharge valves of the compressor (with variable opening), fixed compressor vanes with variable angle, turbine vanes with variable clearance at the tip, variable flow rate fuel pumps, etc.

The term "body" conventionally designates the sub-assembly of a turbine engine, comprising as main members a compressor and a turbine assembled on one and the same axis. Typically a turbine engine may comprise a high pressure body and a low pressure body. Each body comprises a compressor and a turbine, the vanes of which are driven in rotation about the axis of the shaft on which they are mounted.

In general, the various bodies of a turbine engine are designed to operate independently of one another. Their speed of rotations are independent, even if they may be linked or correlated in certain operating speeds.

Therefore, usually, because of this independence between the various bodies of a turbine engine, to control variable geometry equipment items forming part of different bodies, distinct control systems are provided for these distinct equipment items. For this reason, controlling two variable geometry equipment items of two distinct bodies generally requires two control circuits, two actuators, two power sources, etc. It follows that the weight, the cost and the bulk of such a control system for the equipment items are relatively high. Such a configuration is the one retained in the applicant's European patent application, published under the number EP 1 724 474.

For example, the low pressure stage may comprise one or more air discharge valves (often designated VBVs, standing for "variable bleed valve"), whereas the high pressure stage may comprise one or more variable angle stator vane stages (often designated VSVs, standing for "variable stator vanes"). To reduce the weight of such equipment items and their control members, it is possible to envisage not installing any VBVs. While the saving achieved in this way is significant (because of this, the actuators, the servovalves, the ducting, the harnesses, etc. that are associated with them are eliminated), the risks induced are significant, notably at idling speed if water or hail penetrates into the engine, leading to an increased risk of extinguishing of the latter.

The patent application FR 2 445 439 from General Electric Company describes a single means for controlling air discharge valves of a low pressure stage and variable angle stator stages of a high pressure stage, but this means controls both equipment items essentially sequentially, only the stator vanes being actuated in normal operation of the turbine engine (that is to say, above idling speed).

The invention aims to propose a turbine engine with variable geometry equipment items belonging to different bodies of the turbine engine and a control system for these equipment items that is optimized.

Thus, the invention relates to a system for controlling at least two variable geometry equipment items of a turbine engine, the turbine engine comprising at least one first body running at a first speed and a second body running at a second speed, the first equipment item being a variable angle stator vane stage of a compressor of the first body moving between a closed position when idling and an open position at high speed, the second equipment item being at least one discharge valve of a compressor of the second body moving between an open position when idling and a closed position at high speed, characterized in that it includes an actuator which actuates both equipment items.

By using a single actuator to control several (at least two) variable geometry equipment items, the control system makes it possible to reduce the number of parts of the turbine engine and thus achieve the objective of the invention. The weight, the volume and the cost of a second control system are at least largely avoided since the equipment items of the first and second bodies are actuated by the same actuator.

According to one embodiment, the control system is able to control more than two variable geometry equipment items using a single actuator.

According to one embodiment, a variable geometry equipment item is common to several bodies of the turbine engine.

According to one embodiment, the first body being driven at a controllable speed of rotation, the actuator is controlled by the speed of rotation of the first body.

Thus the equipment item of the second body is controlled by the speed of rotation of the first body, via the actuator.

According to a particular embodiment, the first body is a high pressure body and the second body a low pressure body.

In particular, the turbine engine comprising a low pressure compressor and a high pressure compressor, the variable geometry equipment item of the low pressure compressor is controlled by the speed of rotation of the high pressure compressor.

According to one embodiment, in the case of a turbine engine with a high pressure body and a low pressure body, the variable geometry equipment items of the high pressure body are located close to the low pressure body (for example close to the upstream side of the high pressure body).

According to a particular embodiment in this case, the turbine engine is a dual-body turbine engine with a high pressure body and a low pressure body. Preferably, in this case, the variable angle stator vane stage or stages forms or form part of the high pressure body, the first equipment item controlled by the control system forming part of the low pressure body of the turbine engine.

According to a particular embodiment in this case, the vane stage comprises a plurality of vanes, each mounted to pivot on a casing of the turbine engine, and a control ring surrounding the casing is linked to each of the vanes of the stage via levers, the actuator being able to drive in rotation the control ring of the stage via a driving member mounted on the casing.

According to one embodiment, a variable geometry equipment item is an air discharge valve of the turbine engine. This equipment item may comprise one valve or a plurality of air discharge valves. It is, for example, an air discharge valve of the VBV type on the low pressure compressor.

The control system of the invention can be adapted to control various types of equipment items. In addition to those presented hereinabove, the variable geometry equipment items may notably comprise or form an element of one or more of the following devices:

an air discharge valve of the high pressure compressor with proportional opening (often designated "transient bleed valve" (TBV) or "start bleed valve" (SBV));

an on or off air discharge valve of the high pressure compressor (often designated "handling bleed valve" (HBV));

an airflow rate regulation valve contributing to the clearance control in a low pressure turbine (often designated "low pressure turbine active clearance control" (LP-TACC)), or in a high pressure turbine (often designated "high pressure turbine active clearance control" (HP-TACC)).

According to one embodiment, in the control system, the actuator comprises a mobile control member, the displacements of which transmit the control to the variable geometry equipment items. The control member may, for example, comprise the arm of a cylinder.

According to one embodiment, the actuator is arranged to actuate the first variable geometry equipment item by varying a parameter within an actuation band of the first equipment item, the actuator being arranged to actuate the second variable geometry equipment item by varying the same parameter within an actuation band of the second equipment item.

The parameter of the actuator indicated hereinabove may, for example, be the position of the actuation member of the actuator. Thus, this parameter may be the position of the end of the arm of a cylinder. Thus, in this case, varying this parameter means displacing the end of the arm of the cylinder or the position of the working end of the actuator.

According to one embodiment, the actuator drives a return member comprising at least two branches and mounted to move on the casing of the turbine engine, a first branch driving the first equipment item and a second branch driving the second equipment item.

According to a particular embodiment, the second branch drives in rotation, over part of its travel, an actuation part for the second equipment item and does not drive it over the remainder of its travel, said part remaining at rest on an end stop.

According to a particular embodiment, the actuation part is a lever that moves about a rotation axis linked to the casing, a first arm of the lever being intended to cooperate with said second branch and with said end stop and the second arm driving the second equipment item via a sliding junction member forming a dead travel in the actuation of said second equipment item.

When the actuation parameter varies within a range located outside the actuation band of an equipment item, the latter is not actuated by the actuator. Such a range of values of the parameter of the actuator, in which no action is actually applied to the equipment item concerned, constitutes a "dead travel" for said equipment item. In such a band, regardless of the variations of the parameter, the actuator does not act (or does not significantly act) on the equipment item concerned.

According to a particular embodiment, the sliding junction member comprises a first control member having an oblong hole in which slides a rod supported by a second control member.

According to a particular embodiment, the rotation axis of the lever can be displaced along the first arm of said lever.

According to a particular embodiment, the first control member is returned by an elastic means toward the position corresponding to the absence of cooperation between the second branch and the actuation part.

According to a particular embodiment, at least a part of the actuation band of the first equipment item is outside the actuation band of the second equipment item.

The control of two variable geometry equipment items by a single actuator may be facilitated by the fact that the actuation bands of the two equipment items do not totally correspond, enabling only a single equipment item to be actuated outside the common region.

According to a particular embodiment, the actuation band of one of the first and second equipment items is entirely contained within the actuation band of the other equipment item.

In this case, the equipment items are actuated simultaneously within their common region, which may present advantages depending on the nature of the equipment items. Such an embodiment may make it possible to provide a greater actuation amplitude.

According to a particular embodiment in this case, the actuation band of one of the equipment items has an amplitude of very much less than the overall amplitude of the actuation band of the other equipment item; for example, it may represent less than 20% or less than 10% of this band. In this way, when the band of the equipment item with the reduced actuation band is included within the band of the other equipment item, the control actions of the equipment item lead to only a small and/or insensitive variation of the control of the other equipment item. This arrangement facilitates the control, with a single control system, of two equipment items.

The control system is preferably arranged for the variations of the parameter of the actuator between the limits of its actuation band to be sufficient to actuate the equipment with sufficient amplitude.

According to one embodiment, the link between the actuator and one of the equipment items includes a declutching device, able to declutch the driving of this equipment item by the actuator over a band of values of the actuation parameter. This band of values is therefore situated outside the actuation band of the equipment item concerned. Thus, the declutching device makes it possible to reserve a range of the actuation band solely for the control of the other equipment item or items. This may be essential when the equipment item concerned must not be affected, even when the control of one of the other controlled equipment items varies.

According to one embodiment, the control system also includes return means for maintaining a control member of one of the equipment items in a predetermined position, at least when the parameter of the actuator varies within a range located outside the actuation band of the equipment item.

The invention also relates to a turbine engine equipped with a control system described hereinabove.

The invention will be better understood from the following description of the preferred embodiment of the turbine engine and of the inventive system, with reference to the appended drawing plates in which.

As is known, a turbine engine, here of axis X-X, comprises, from upstream to downstream, a fan, a low pressure compressor (often designated "booster" by those skilled in the art), a high pressure compressor, a combustion chamber, a high pressure turbine, a low pressure turbine and a nozzle for ejecting gases (not represented). The compressor and the high pressure turbine are fixed to one and the same shaft, called high pressure shaft, and thus belong to the high pressure body of the turbine engine, whereas the compressor and the low pressure turbine are fixed to one and the same shaft, called low pressure shaft, and thus belong to the high pressure body of the turbine engine.

Hereinbelow, the following abbreviations will be used: BP for low pressure and HP for high pressure.

The HP compressor comprises at least one stage formed by a wheel of mobile vanes and a wheel of fixed vanes (also called stator vanes). Each stage is formed by a plurality of vanes positioned radially around the X-X axis of the turbine engine. In the case in point, the HP compressor comprises a plurality of stages, with alternating wheels of mobile vanes and wheels of fixed vanes. The vanes are enclosed in a cylindrical casing which is centered on the axis X-X of the turbine engine.

Figure 1:
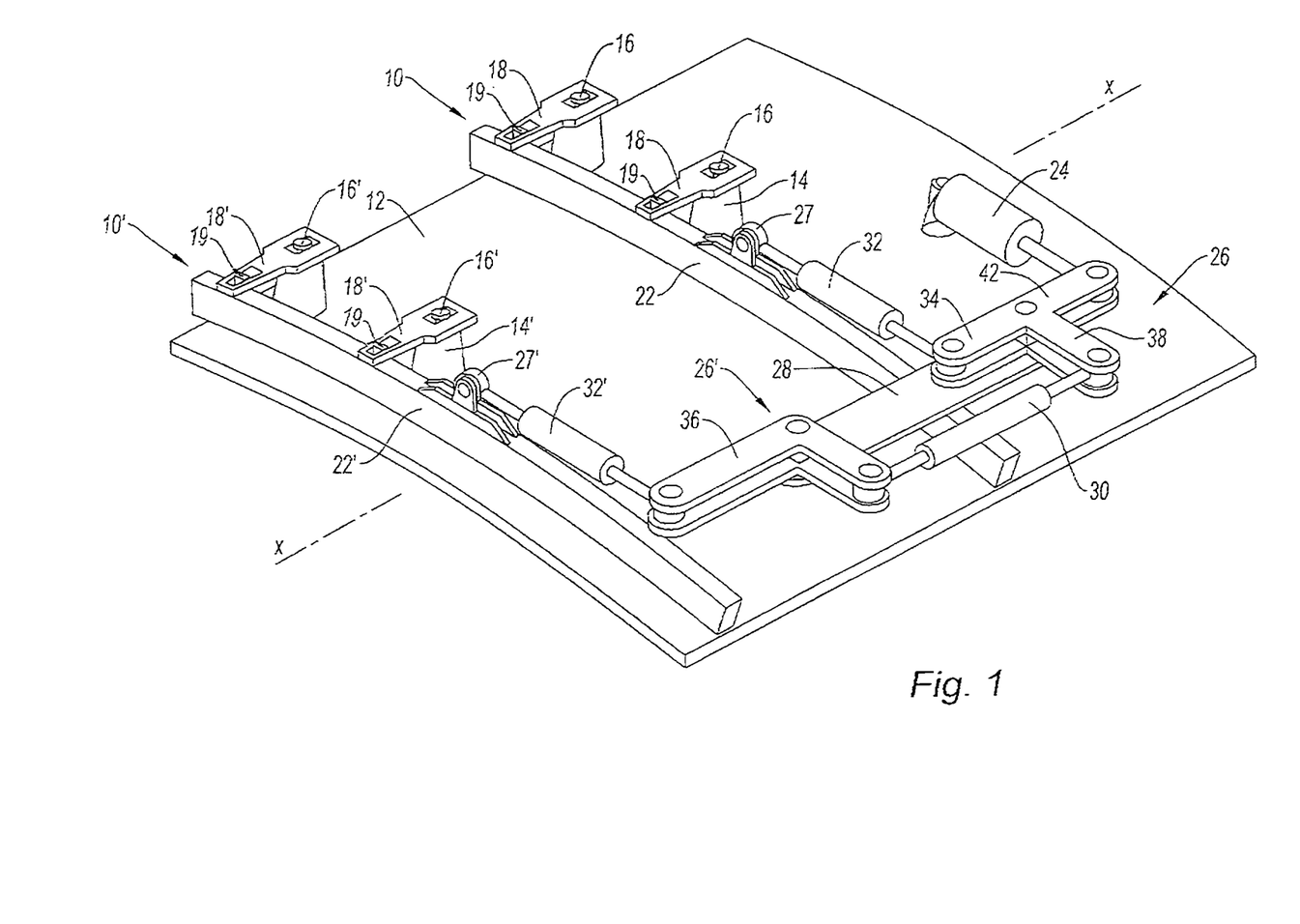
FIG. 1 represents a perspective view of a system for controlling the position of variable angle stator vanes according to the prior art.

Among the fixed vane wheels, at least one stage 10 comprises vanes 14 said to be of variable angle. Each vane 14 is mounted to pivot about an axis 16 (or pivot) which passes through the casing 12. The angular position of each vane 14 can be adjusted by driving the pivot 16 thereof in rotation.

The stage 10 of variable angle vanes forms a first variable geometry equipment item, belonging to the HP body (since it belongs to the HP compressor). The variable parameter of this equipment item is the angle of the vanes 14; in the case in point, all the vanes 14 are driven simultaneously in rotation, by virtue of a ring 22 controlling the stage 10 of vanes 14.

The control ring 22 is of overall circular shape; it surrounds the casing 12 and is centered on the axis X-X of the turbine engine. The synchronized modification of the angular position of the vanes 14 is thus obtained by a rotation of the control ring 22 about the axis X-X of the turbine engine, as is known.

Figure 2:
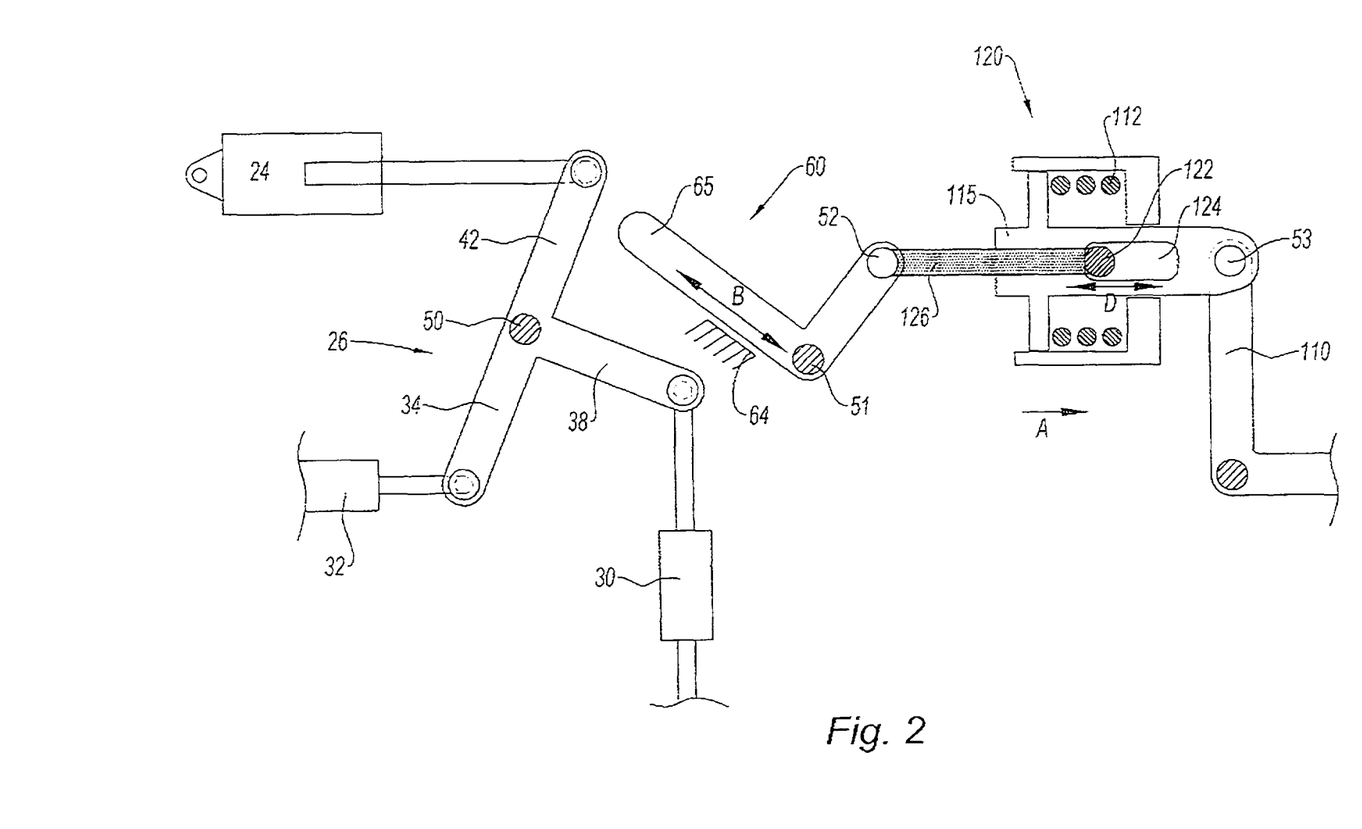
FIG. 2 is a diagrammatic view of a device for controlling the position of the discharge valves of a compressor based on the position control of the vanes of a variable angle stator according to one embodiment of the invention; it represents this device in the position that corresponds to a high speed of rotation of the engine (stator vanes open and discharge valves closed)

The turbine engine comprises a second variable geometry equipment item 110. In the case in point, it is an air discharge valve, of the VBV type (represented diagrammatically herein). The variable parameter of this equipment item 110 is the opening angle of the discharge valve 110. This equipment item 110 belongs to the BP body of the turbine engine. The function of the VBV valve 110 is to discharge air at the outlet of the BP compressor to reduce the risks of poor operation of this compressor when it is operating in particular conditions.

Obviously, as is known, the second equipment item 110 could include a plurality of such valves.

The control system is arranged to control the rotation of the control ring 22 of the stage 10 of variable angle vanes (first equipment item 10), and the displacement of a control member 115 for the second equipment item 110.

To this end, the control system comprises an actuator 24, in the case in point a cylinder 24, which is mechanically linked to the first equipment item 10 and to the second equipment item 110 to drive them in movement. A single actuator 24 thus controls two variable geometry equipment items 10, 110 of two distinct bodies.

To this end, each pivot 16 of the variable angle vanes 14 is linked to one end of a controlling connecting rod 18 or lever 18, the other end of which is articulated around a trunnion 19 fixed to the control ring 22 and extending radially relative to it.

The ring comprises at least one end fitting 27 to which is fixed one end of a control rod 32, of the stretching screw type, extending roughly tangentially to the ring 22. The other end of the control rod 32 is firmly attached to a so-called driving (because it is directly linked to the actuator 24) return member 26, mounted to pivot on a module 28 of the casing 12 of the turbine engine. The driving return member 26 is more specifically T-shaped. The control rod 32 is fixed to one end of a first branch 34 of the T, the end of the rod of the cylinder 24 being fixed, in an articulated manner, to the end of the actuation branch 42 of the T which is located in the extension of the first branch 34. The second branch 38, perpendicular to the other two, fulfills another function, described below. The driving return member 26 is mounted to pivot about an axis 50 extending at the intersection of the branches.

The actuator (cylinder) 24 can drive in rotation the control ring 22 of the variable angle vane stage 10 via the driving return member 26, which transmits the movement of the cylinder 24 to the control rod 32 which in turn transmits the movement to the ring 22 to which it is firmly attached in translation (curvilinear).

The driving return member 26 and the rod 32 are the main elements of the movement transmission chain from the actuator (cylinder 24) to the control ring 22.

The cylinder 24 is controlled by an electronic control unit. Its movements depend on the speed of rotation N2 of the HP compressor.

The invention has been presented with a single variable angle vane stage but obviously it can be implemented with a plurality of stages, the stages being linked conventionally with a first return 26, called driving return, and returns 26', called following returns, driven via a synchronization bar 30.

The control system also controls the displacement of a control member 115 for the second equipment item 110, using a specific device.

Figure 3:
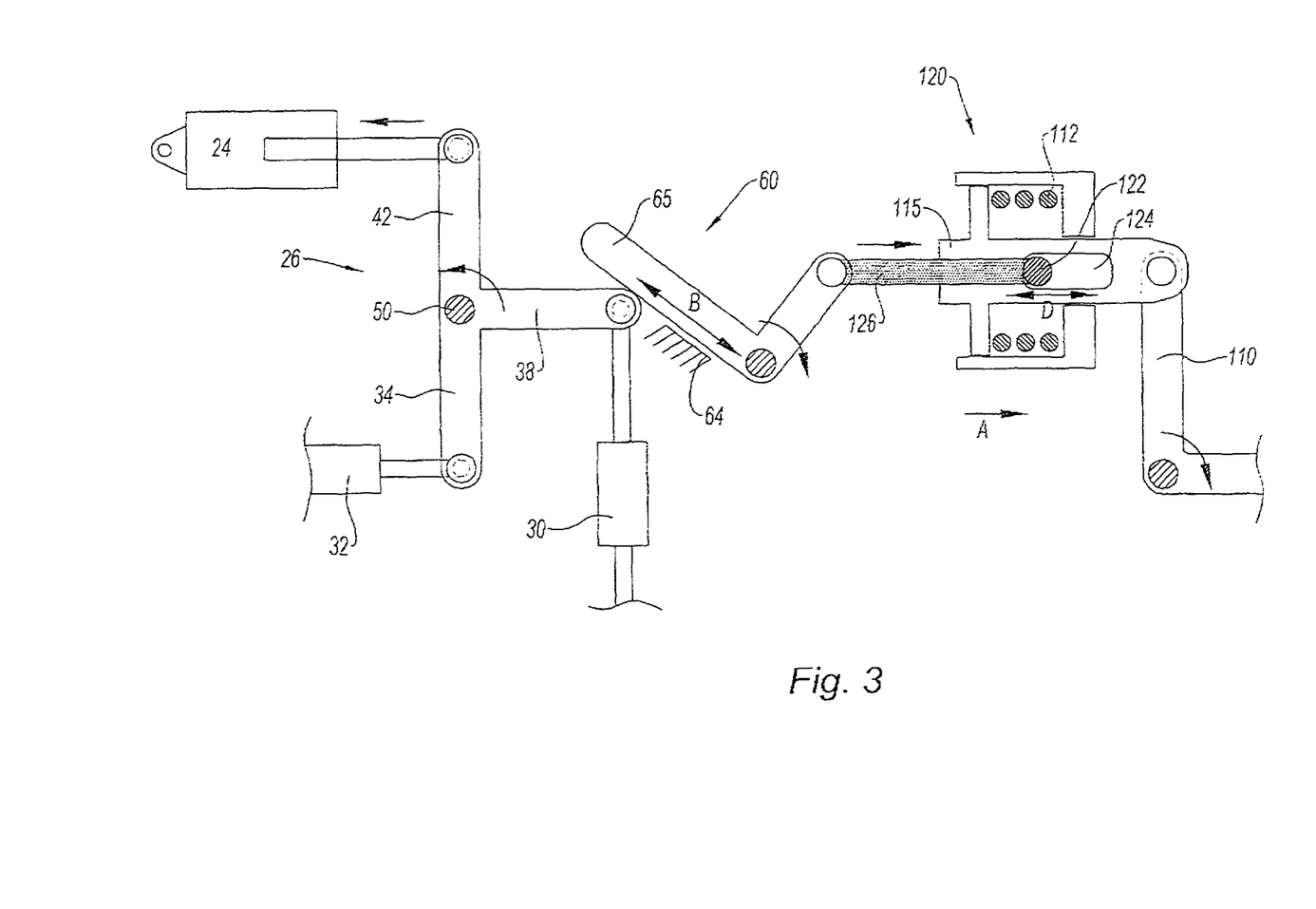
FIG. 3 is a diagrammatic view of the same device at intermediate engine speed of rotation, the stator vanes being in the process of closing and the discharge valves still being closed.
Figure 4:
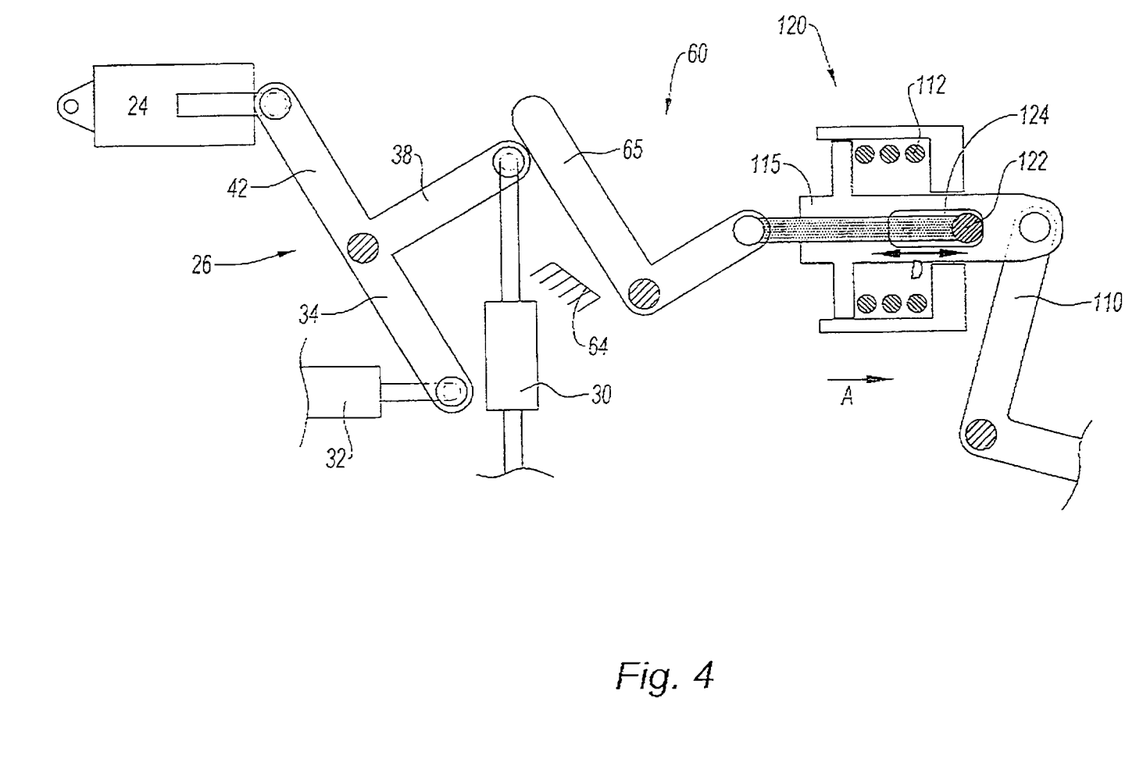
FIG. 4 is a diagrammatic view of the same device at low engine speed of rotation, the stator vanes being closed and the discharge valves open.

Now referring to FIGS. 2 to 4, a device 60 for actuating discharge valves using the control system for the variable angle stator vanes can be seen. The return member 26, which is mobile in rotation about the axis 50, generates the displacement of the rod 32 via its first branch 34, and that of a synchronization bar 30 via its second branch 38; it also drives an actuation part 65 via its branch 38. This actuation part 65 is in the form of an L-shaped lever, and is mobile in rotation about a first axis 51 linked to the casing 12. It is permanently returned by an elastic return means, not represented, toward the second branch 38 and rests, in the absence of cooperation with the branch 38, on an end stop 64. One of its arms is able to cooperate with the second branch 38 to transmit the rotation of the return member 26 to a U-shaped stirrup 126 which is attached to the second arm of the part 65, by a second articulation 52. A rotation of the return member 26 is reflected in a longitudinal displacement of the stirrup 126 which is displaced like a type of rod being displaced in a slideway.

The two branches of the stirrup 126 pass either side of a first control member 115 of the variable geometry 110, which controls the displacements of the variable geometry equipment item 110 in the direction indicated by the arrow A. This control member 115 is in the form of a rectangular plate with an oblong hole 124. The two branches of the stirrup 126, forming a second member for the control of the second equipment item 110, are linked by a rod 122 which passes through the oblong hole 124, in which it slides.

The stirrup 126 and the rod 122 constitute the sliding junction member 120. The actuator 24 drives the second equipment item 110 via this sliding junction member 120, the sliding of which defines a dead travel D. In practice, as long as the rod 122 is displaced inside the elongate hole 124 without being locked at one end of the latter, this will cause no movement of the control member 115, in other words the movements of the actuator (the cylinder 24) do not cause any movement of the control member 115 of the equipment item 110.

In the absence of action on the part of the return member 26 on the actuation part 65, a spring 112 pushes back the control member 115 and maintains the second equipment item 110 in the position corresponding to the closed position of the discharge valves. The return spring of the part 65 causes the latter to be rotated about the second articulation 52 until it comes against the end stop 64 which limits the rotation of the actuation part in the direction of closure of the stator vanes. It is then held bearing against the end stop 64 by the elastic return means mentioned above.

Finally, the actuation part 65 is, as represented in FIGS. 2 to 4, in the shape of an L, the two arms of which join at the first rotation axis 51. The length of its first arm, that is to say, the arm which cooperates with the branch 38 of the return 26, can be reduced by displacing the point where it is fixed to the rotation axis. This displacement causes the gearing of the movement that exists between the rotation of the return 26 and the displacement of the stirrup 126 to be modified. The amplitude of this gearing modification is determined by the travel B along which the rotation axis 51 can be displaced.

Figure 5:
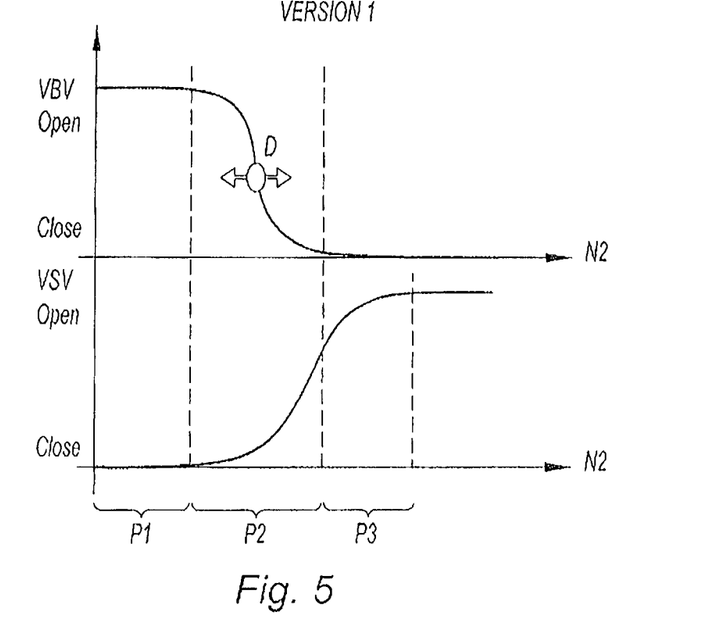
FIGS. 5 and 6 are curves giving the position of the stator vanes and of the discharge valves according to the speed of the engine, in the case of an overlap and in the case of an absence of overlap in the opening and closure bands of the two equipment items.
Figure 6:
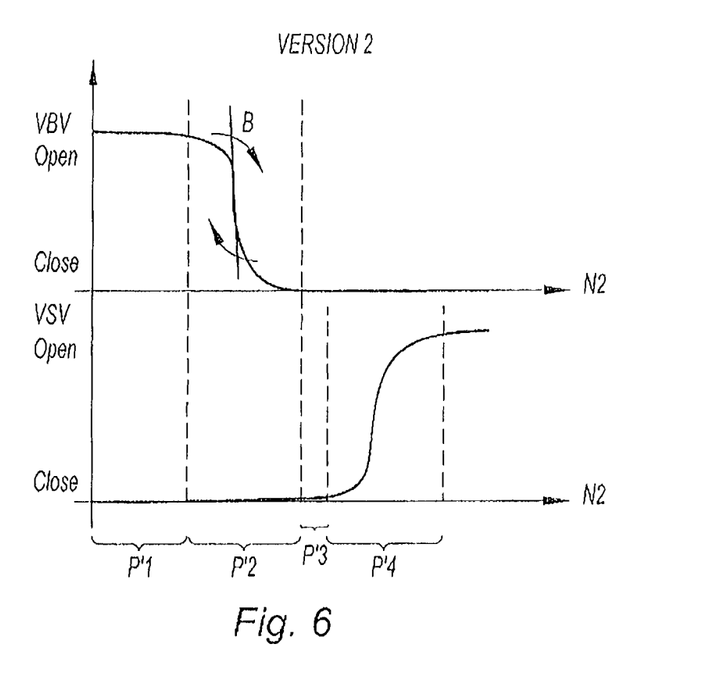

Referring to FIGS. 5 and 6, the relative opening laws of the variable angle vanes (referenced VSV) and of the discharge valves (referenced VBV) can be seen as a function of the speed of rotation N2 of the HP body. The greater the value of the curve, the more open the corresponding variable geometry equipment item 10, 110 becomes. The open position of the vanes VSV 14 corresponds to the position in which they allow the greatest flow of air to pass into the HP compressor 3; the open position of the valves VBV 110 corresponds to the position in which they take the maximum air flow rate from the BP compressor.

In a first phase P1, at low speed, the discharge valves VBV 110 are open while the variable angle vanes VSV 14 are closed. In a second phase P2, at intermediate speed, the valves VBV 110 are gradually closed as the speed N2 of the HP body increases, whereas the vanes VSV 14 are gradually opened as the speed N2 of the HP body increases; at the end of the second phase P2, the valves VBV 110 are almost completely closed whereas the vanes VSV 14 are around two thirds open. In a third phase P3, the closure of the valves VBV 110 is finalized whereas the opening of the vanes VSV 14 is gradually finalized as the speed N2 of the HP body increases.

Thus, the two variable geometry equipment items 10, 110 are driven by the speed of the HP body. In particular, the valves VBV 110, belonging to the BP body, are controlled by the speed of rotation N2 of the HP body. The result of this is a simplification of the definition of the opening laws and a guarantee of good synchronization between the openings and closures of the variable geometry equipment items since these openings and closures depend on one and the same single parameter: the speed of rotation N2 of the HP body.

In the version V1 represented in FIG. 5, the opening of the variable angle vanes VSV begins at the same time as the closure of the discharge valves VBV, but ends after, whereas in the version V2, represented by FIG. 6, it begins only after their closure. The choice of one version, and the exact moment at which the closure of the discharge valves begins, are defined by acting on the position and the length D of the oblong hole 124. An elongation or a shortening of this opening shifts the opening of the discharge valves, in one direction or the other, relative to the closure of the variable angle vanes.

As indicated previously, a modification of the positioning of the first rotation axis 51 on the first arm of the actuation part 65, within the limit of the travel B, results in a modification of the gearing of the movement generated by the rotation of the return 26. A shortening of the arm of the L increases the rotation of the actuation part 65 for a given rotation of the return 26, which is reflected in a faster opening of the discharge valves and a tangent at the point of inflection of the VBV curve in FIG. 6 that is more vertical. Conversely, an enlarging of the lever arm on the first arm of the actuation part 65 will produce a tangent at the point of inflection of the curve in FIG. 6 that is less vertical and a more gradual opening of the discharge valves.

In order to convey an understanding of how the control system 1 operates, FIGS. 2 to 4 illustrate the movement of this system in three positions, corresponding to a maximum, intermediate and minimum extension of the cylinder 24. In the control system 1, the extension of the cylinder 24 is the actuation parameter of this actuator.

There now follows a description of the operation of the stator vanes and of the discharge valves during a modification of the speed of rotation N2 of the HP body, taking for example a deceleration of the engine from the full throttle position. In this initial situation (FIG. 2) the cylinder is in the maximum extension position; the variable angle vanes 14 are in the open position and the discharge valves are closed. The branch 38 of the return member 26 is distant from the first arm of the actuation part 65 which rests against the end stop 64, under the action of the elastic return means of the part 65. The spring 112 maintains the control member 115 in the position corresponding to the discharge valves being closed.

From this position, the actuation of the cylinder 24 provokes a rotation of the driving return 26, and, where appropriate, that of a following return 26' driven by the synchronization bar 30. The rotation of the return 26 about its pivoting point on the module 28 in turn drives the rod 32 which then rotates the ring 22 in one direction or the other about the axis X-X of the turbine engine. As indicated previously, the rotation of the ring 22 causes a synchronized modification of the angular position of the vanes 14 of the stage 10 via control levers 18.

With the speed of rotation decreasing, the return 26 revolves until the moment when its second branch 38 comes into contact with the first arm of the actuation part 65, as illustrated in FIG. 3 which corresponds to a specific position during the contraction of the cylinder 24.

With the cylinder 24 contracting further, the return 26 begins to rotate the actuation part 65 about its rotation axis 51 and consequently push the rod 122 of the stirrup 126 in the oblong hole 124, in the direction of the arrow A. The position represented in FIG. 3 is specific in that it corresponds to the precise moment when the rod 122 firmly attached to the stirrup 126 comes to a stop at the end of the hole 124 in the direction of the arrow A (which is the direction of actuation for the control member 115), a position from which the rod 122 begins to drive the control member (plate 115) of the variable geometry 110. Conversely, from the beginning of the contraction of the cylinder 24, and as far as this position, the control member 115 is not displaced from its initial position (FIG. 2) despite the displacement of the stirrup 126. Therefore, the actuation band of the cylinder 24, between its initial position (FIG. 2) and the specific intermediate position of FIG. 3, constitutes a dead travel D for the second controlled equipment item 110. During this movement, the valves of the stator are gradually closed whereas the discharge valves remain fully closed.

On the other hand, from the start of actuation position that appears in FIG. 3, any additional contraction of the cylinder 24 causes the rod 122 firmly attached to the stirrup 126 to push back, in the direction of the arrow A, the control member 115 and causes a displacement of the latter. The positions of the cylinder 24 that are contracted further than in this position constitute the actuation band of the second equipment item 110. The discharge valves consequently open. This opening occurs more or less gradually depending on the adjustment B retained for the length of the lever arm of the actuation part 65.

It should be noted in addition that, when the cylinder 24 exceeds this start of actuation position, the spring 112 acts as return means to maintain the control member 115 in permanent contact with the rod 122. Thus, outside of the dead travel, the control member 115 follows, at each instant, the displacements of the rod 122, in the direction of the arrow A and in the opposite direction. Conversely, in the dead travel of the sliding junction member 120, the control member 115 remains immobilized, in the "left-hand" position in FIGS. 2 and 3, under the effect of the elastic return means of the actuation part 65.

With the speed of rotation continuing to reduce, the cylinder is controlled to full retraction, which corresponds to discharge valves completely open and a continuing closure of the stator vanes, until they are fully closed (position illustrated in FIG. 4).

In line with the increase in the speed of rotation N2 from idling speed, the cylinder 24 extends and rotates the return member 26 in the opposite direction to the preceding direction. Under the action of its elastic return means, the actuation part 65 returns to its end stop 64 driving with it the stirrup 126. The control member 115, no longer being subject to the pressure of the rod 122, accompanies, under the action of the spring 112, the stirrup 126 in its displacement which initiates the closure of the discharge valves. The movement of the control member 115 continues until the spring 112 is fully expanded, then the rod 122, still driven by the elastic return means of the actuation part, travels along the oblong hole 124 until it abuts against the other end of this hole. The assembly comprising actuation part 65, stirrup 126 and control member 115 continues its travel until the first arm of the actuation part 65 encounters the end stop 64.

In this position, the discharge valves are fully closed. The opening of the stator vanes, for its part, continues with the rotation of the return 26, the movement of which from this instant no longer interferes with that of the discharge valves.

Although the invention has been described in relation to several specific embodiments, it is obvious that it is in no way limited thereto and that it comprises all the technical equivalents of the means described and their combinations providing that the latter fall within the context of the invention.

The invention claimed is:

1. A system for controlling at least first and second variable geometry equipment items of a turbine engine, the turbine engine including at least one first body and a second body, the first equipment item being a variable angle stator vane stage of a compressor of the first body moving between a closed position when idling and an open position at high speed, the second equipment item being at least one discharge valve of a compressor of the second body moving between an open position when idling and a closed position at high speed, the system comprising:

an actuator driving a return member including at least two branches and mounted to move on the casing of the turbine engine, a first branch driving the first equipment item and a second branch driving the second equipment item, wherein the second branch drives in rotation, over part of its travel, an actuation part for the second equipment item and does not drive the actuation part over a remainder of its travel, the actuation part remaining at rest on an end stop.

2. The control system as claimed in claim 1, in which the first body is a high pressure body and the second body a low pressure body.

3. The control system as claimed in claim 1, in which the actuator is controlled by a speed of rotation of one of the bodies of the turbine engine.

4. The control system as claimed in claim 2, in which the actuator is controlled by a speed of rotation of the high pressure body.

5. The control system as claimed in claim 4, in which the actuation part includes a lever that moves about a rotation axis linked to the casing, a first arm of the lever configured to cooperate with the second branch and with the end stop, and the second branch driving the second equipment item via a sliding junction member forming a dead travel in the actuation of the second equipment item.

6. The control system as claimed in claim 5, in which the sliding junction member includes a first control member having an oblong hole in which a rod supported by a second control member slides.

7. The control system as claimed in claim 5, in which the rotation axis of the lever is configured to be displaced along the first arm of the lever.

8. The control system as claimed in claim 6, in which the first control member is returned by an elastic means toward a position corresponding to absence of cooperation between the second branch and the actuation part.

9. The control system as claimed in claim 4, in which an actuation band of the second equipment item is included within an operating band of the first equipment item.

10. A turbine engine comprising a control system as claimed in claim 1.

* * * * *